United States Patent
Chen et al.

(10) Patent No.: US 9,374,148 B2
(45) Date of Patent: Jun. 21, 2016

(54) SUBFRAME DEPENDENT TRANSMISSION MODE IN LTE-ADVANCED

(75) Inventors: Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 12/901,432

(22) Filed: Oct. 8, 2010

(65) Prior Publication Data

US 2011/0116437 A1    May 19, 2011

Related U.S. Application Data

(60) Provisional application No. 61/262,089, filed on Nov. 17, 2009, provisional application No. 61/262,873, filed on Nov. 19, 2009.

(51) Int. Cl.
| | |
|---|---|
| *H04B 7/06* | (2006.01) |
| *H04L 5/00* | (2006.01) |
| *H04L 25/02* | (2006.01) |
| *H04W 88/06* | (2009.01) |

(52) U.S. Cl.
CPC ............ *H04B 7/0689* (2013.01); *H04L 5/0023* (2013.01); *H04L 25/0204* (2013.01); *H04W 88/06* (2013.01)

(58) Field of Classification Search
USPC .......................................................... 370/328
See application file for complete search history.

(56) References Cited

U.S. PATENT DOCUMENTS

| | | | |
|---|---|---|---|
| 8,174,995 B2 | 5/2012 | Malladi et al. | |
| 2008/0089312 A1* | 4/2008 | Malladi ................... | H04L 5/005 370/345 |
| 2010/0323684 A1* | 12/2010 | Cai et al. .................... | 455/422.1 |
| 2012/0099536 A1* | 4/2012 | Lee .......................... | H04L 5/005 370/328 |
| 2012/0327897 A1 | 12/2012 | Huang et al. | |

FOREIGN PATENT DOCUMENTS

| | | |
|---|---|---|
| CN | 1969475 A | 5/2007 |
| CN | 101005653 A | 7/2007 |
| CN | 101489184 A | 7/2009 |
| JP | 2010206285 A | 9/2010 |
| WO | 2008024751 A2 | 2/2008 |

(Continued)

OTHER PUBLICATIONS

ETSI TS 136.213 V8.8.0 (Oct. 2009)—LTE; Evolved Universal Terrestrial Radio Access (E-UTRA); Physical layer procedures (3GPP TS 36.213 version 8.8.0 Release 8), European Telecommunications Standards Institute 2009, pp. 1-79.

(Continued)

*Primary Examiner* — Sulaiman Nooristany
(74) *Attorney, Agent, or Firm* — Ashish L. Patel

(57) ABSTRACT

A method of wireless communication includes communicating in a plurality of subframes. The subframes include a first type of subframe and a second type of subframe. The method further includes utilizing a transmission mode for each of the subframes based on the type of each of the subframes. A second method of wireless communication includes communicating in a plurality of subframes. The subframes include a first type of subframe and a second type of subframe. The second method further includes configuring a UE with a transmission mode for each of the subframes based on the type of each of the subframes.

46 Claims, 14 Drawing Sheets

(56) References Cited

FOREIGN PATENT DOCUMENTS

| WO | 2008118064 A2 | 10/2008 |
|----|---------------|---------|
| WO | 2009061403 A2 | 5/2009  |

OTHER PUBLICATIONS

Email Discussion Rapporteur, "Summary of Relay email discussion [59-12-LTE-A], R-PDCCH", 3GPP Draft, R1-100380, 3rd Generation Partnership Project (3GPP), Mobile Competence Centre, 650, Route Des Lucioles, F-06921 Sophia-Antipolis Cedex, France, vol. RAN WG1, No. Valencia, Spain, Jan. 18, 2010, Jan. 22, 2010, XP050418415.

International Search Report and Written Opinion—PCT/US2010/056911, International Search Authority—European Patent Office—Feb. 15, 2011.

LG Electronics Inc, "Consideration on Demodulation RS in the DL Backhaul", 3GPP Draft, R1-094801—Relay Backhaul DM RS Final, 3rd Generation Partnership Project (3GPP), Mobile Competence Centre, 650, Route Des Lucioles, F-06921 Sophia-Antipolis Cedex, France, No. Jeju, Nov. 9, 2009, XP050389197.

QUALCOMM Europe, "CSI-RS vs. legacy UE operation", 3GPP Draft, R1-094866 CSI-RS, 3rd Generation Partnership Project (3GPP), Mobile Competence Centre, 650, Route Des Lucioles, F-06921 Sophia-Antipolis Cedex, France, No. Jeju, Nov. 9, 2009, XP050389246.

QUALCOMM Europe, "Downlink MIMO transmission modes", 3GPP Draft, R1-094872 DL MIMO Transmission Modes, 3rd Generation Partnership Project (3GPP), Mobile Competence Centre, 650, Route Des Lucioles, F-06921 Sophia-Antipolis Cedex, France, No. Jeju, Nov. 9, 2009, XP050389250.

Samsung, "CSI Feedback Signaling in LTE-A", 3GPP Draft, R1-093381 CSI Feedback, 3rd Generation Partnership Project (3GPP), Mobile Competence Centre 3 650, Route Des Lucioles, F-06921 Sophia-Antipolis Cedex, France, No. Shenzhen, China, Aug. 19, 2009, XP050351678.

Alcatel-Lucent, "Signaling of MBSFN Subframe Allocations", 3GPP Draft, R1-080210_Signalling_of MBSFN Subframe All Ocations, 3rd Generation Partnership Project (3GPP), Mobile Competence Centre, 650, Route Des Lucioles, F-06921 Sophia-Antipolis Cedex, France, vol. RAN WG1, No. Sevilla, Spain, Jan. 8, 2008, XP050108737.

Ericsson, "RS Design for LTE-Advanced and Overhead Reductions", 3GPP Draft, R1-092021, 3rd Generation Partnership Project (3GPP), Mobile Competence Centre, 650, Route Des Lucioles, F-06921 Sophia-Antipolis Cedex, France, No. San Francisco, USA, Apr. 28, 2009, XP050339489.

Samsung, "Discussions on CSI-RS for LTE-Advanced", 3GPP Draft, R1-093375 CSI RS Designs in LTE-A, 3rd Generation Partnership Project (3GPP), Mobile Competence Centre, 650, Route Des Lucioles, F-06921 Sophia-Antipolis Cedex, France, No. Shenzhen, China, Aug. 19, 2009, XP050351673.

Samsung, "DL transmission modes for Rel-10", 3GPP Draft, R1-102208 DLTXMODES, 3rd Generation Partnerhsip Project (3GPP), Mobile Competence Centre, 650, Route Des Lucioles, F-06921 Sophia-Antipolis Cedex, France, vol. RAN WG1, No. Beijing, china, Apr. 12, 2010, Apr. 6, 2010, XP050419480.

Samsung, "Transmit diversity in MBSFN subframes", 3GPP Draft, R1-094586 TXD, 3rd Generation Partnership Project (3GPP), Mobile Competence Centre, 650, Route Des Lucioles, F-06921 Sophia-Antipolis Cedex, France, No. Oeju, Nov. 9, 2009, Nov. 12, 2009, XP050388999.

Vodafone Group et al, "Blank subframes for LTE evolution", 3GPP Draft, R1-092879.Blank Subframes, 3rd Generation Partnership Project (3GPP), Mobile Competence Centre, 650, Route Des Lucioles, F-06921 Sophia-Antipolis Cedex, France, No. Los Angeles, USA, Jul. 7, 2009, XP050351311.

Taiwan Search Report—TW099139545—TIPO—Nov. 11, 2013.

QUALCOMM Europe: "Details of CSI-RS", 3GPP TSG-RAN WG1 #59, R1-094867, Nov. 9-13, 2009, Jeju, Korea, pp. 1-6.

* cited by examiner

SUBFRAME DEPENDENT TRANSMISSION MODE IN LTE-ADVANCED

CROSS-REFERENCE TO RELATED APPLICATION(S)

This application claims the benefit of U.S. Provisional Application Ser. No. 61/262,089, entitled "Subframe Dependent Downlink Transmission Mode In LTE-Advanced" and filed on Nov. 17, 2009, and the benefit of U.S. Provisional Application Ser. No. 61/262,873, entitled "Subframe Dependent Downlink Transmission Mode In LTE-Advanced" and filed on Nov. 19, 2009, both of which are expressly incorporated by reference herein in their entirety.

BACKGROUND

1. Field

The present disclosure relates generally to communication systems, and more particularly, to a subframe dependent transmission mode in LTE-Advanced.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method of wireless communication includes communicating in a plurality of subframes. The subframes include a first type of subframe and a second type of subframe. The method further includes utilizing a transmission mode for each of the subframes based on the type of each of the subframes.

In an aspect of the disclosure, a method of wireless communication includes communicating in a plurality of subframes. The subframes include a first type of subframe and a second type of subframe. The method further includes configuring a user equipment with a transmission mode for each of the subframes based on the type of each of the subframes.

In an aspect of the disclosure, an apparatus for wireless communication includes means for communicating in a plurality of subframes. The subframes include a first type of subframe and a second type of subframe. The apparatus further includes means for utilizing a transmission mode for each of the subframes based on the type of each of the subframes.

In an aspect of the disclosure, an apparatus for wireless communication includes means for communicating in a plurality of subframes. The subframes include a first type of subframe and a second type of subframe. The apparatus further includes means for configuring a user equipment with a transmission mode for each of the subframes based on the type of each of the subframes.

In an aspect of the disclosure, a computer program product includes a computer-readable medium. The computer-readable medium includes code for communicating in a plurality of subframes. The subframes include a first type of subframe and a second type of subframe. The computer-readable medium further includes code for utilizing a transmission mode for each of the subframes based on the type of each of the subframes.

In an aspect of the disclosure, a computer program product includes a computer-readable medium. The computer-readable medium includes code for communicating in a plurality of subframes. The subframes include a first type of subframe and a second type of subframe. The computer-readable medium further includes code for configuring a user equipment with a transmission mode for each of the subframes based on the type of each of the subframes.

In an aspect of the disclosure, an apparatus for wireless communication includes a processing system. The processing system is configured to communicate in a plurality of subframes. The subframes include a first type of subframe and a second type of subframe. The processing system is further configured to utilize a transmission mode for each of the subframes based on the type of each of the subframes.

In an aspect of the disclosure, an apparatus for wireless communication includes a processing system. The processing system is configured to communicate in a plurality of subframes. The subframes include a first type of subframe and a second type of subframe. The processing system is further configured to configure a user equipment with a transmission mode for each of the subframes based on the type of each of the subframes.

DETAILED DESCRIPTION

Figure 1:
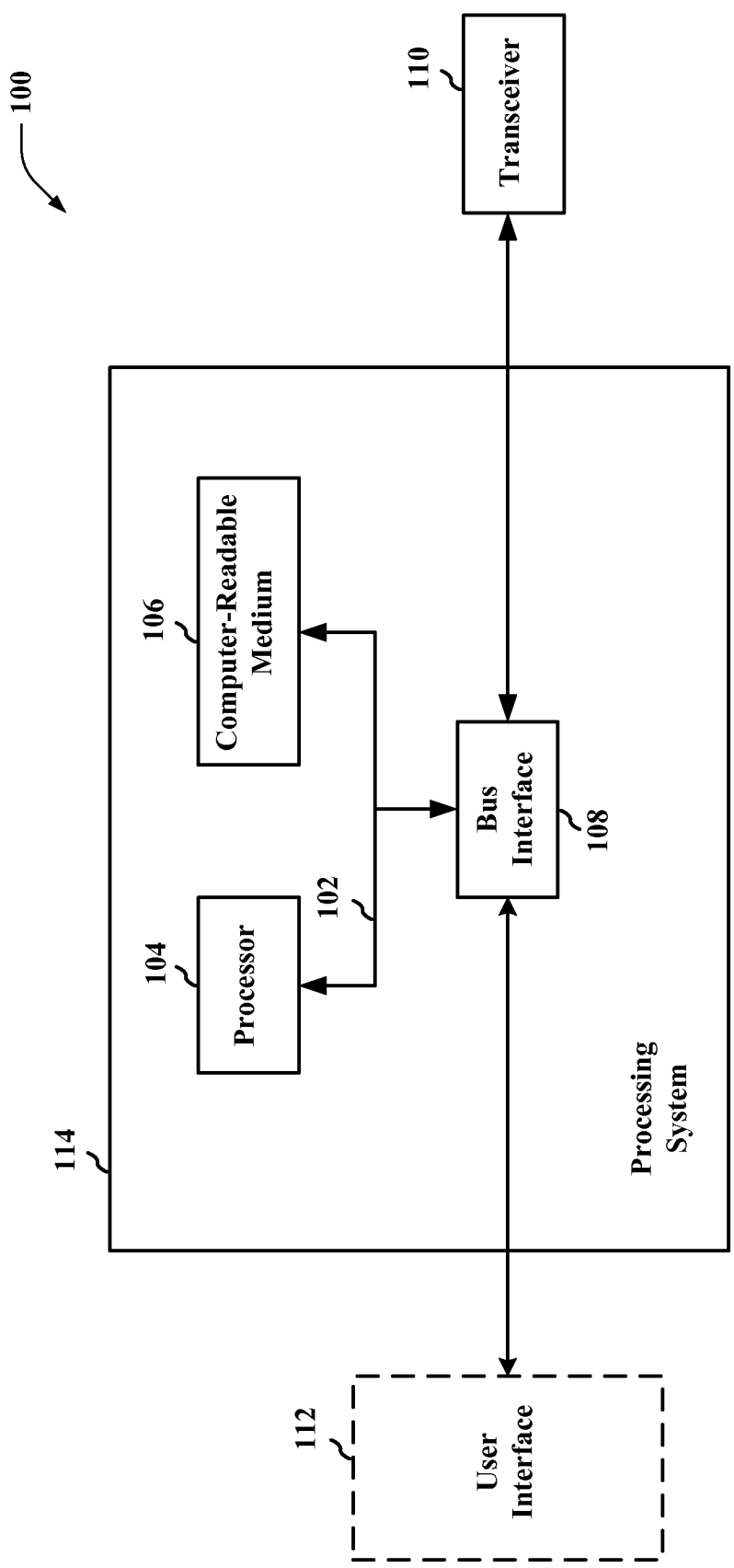
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
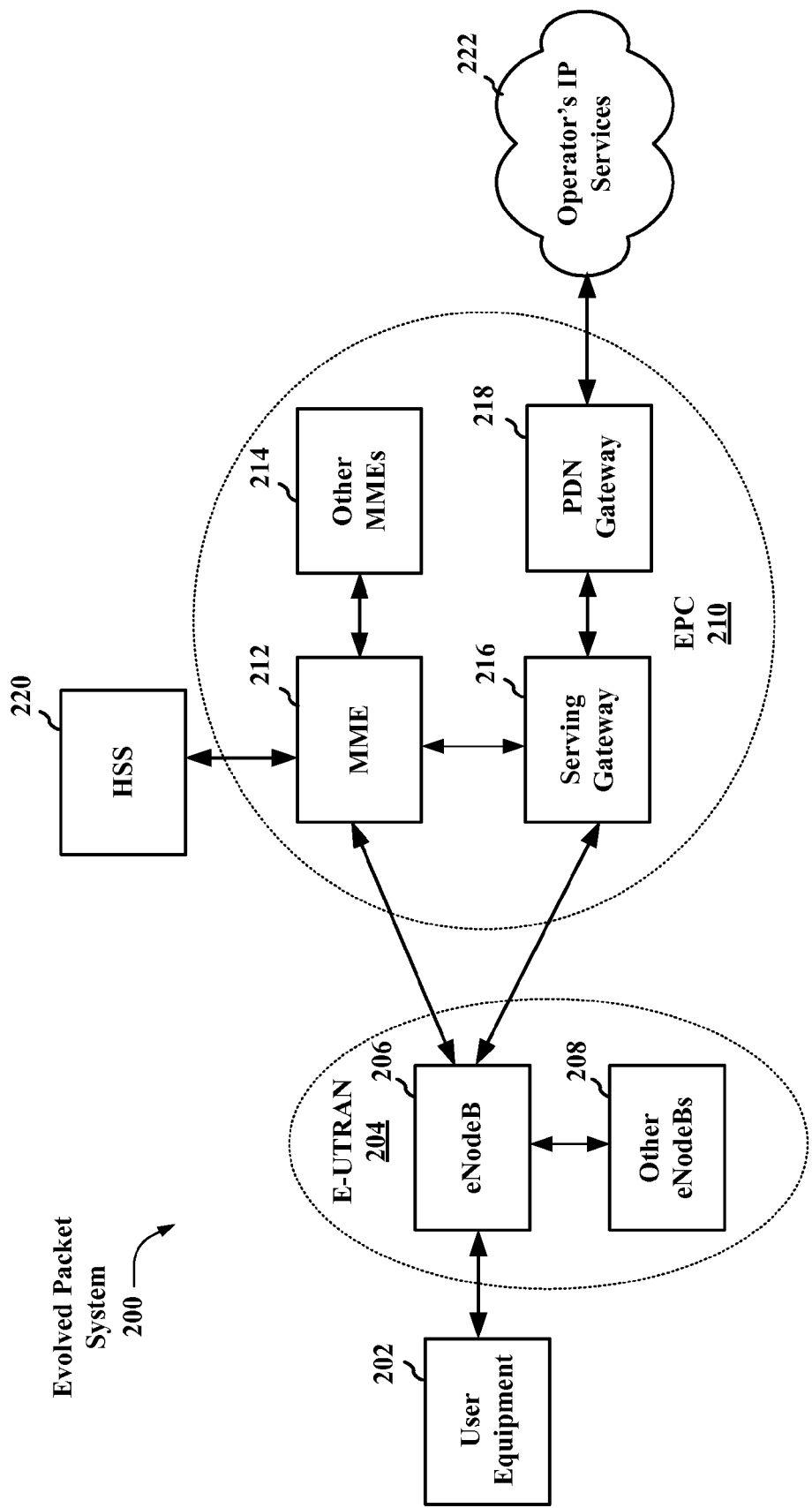
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
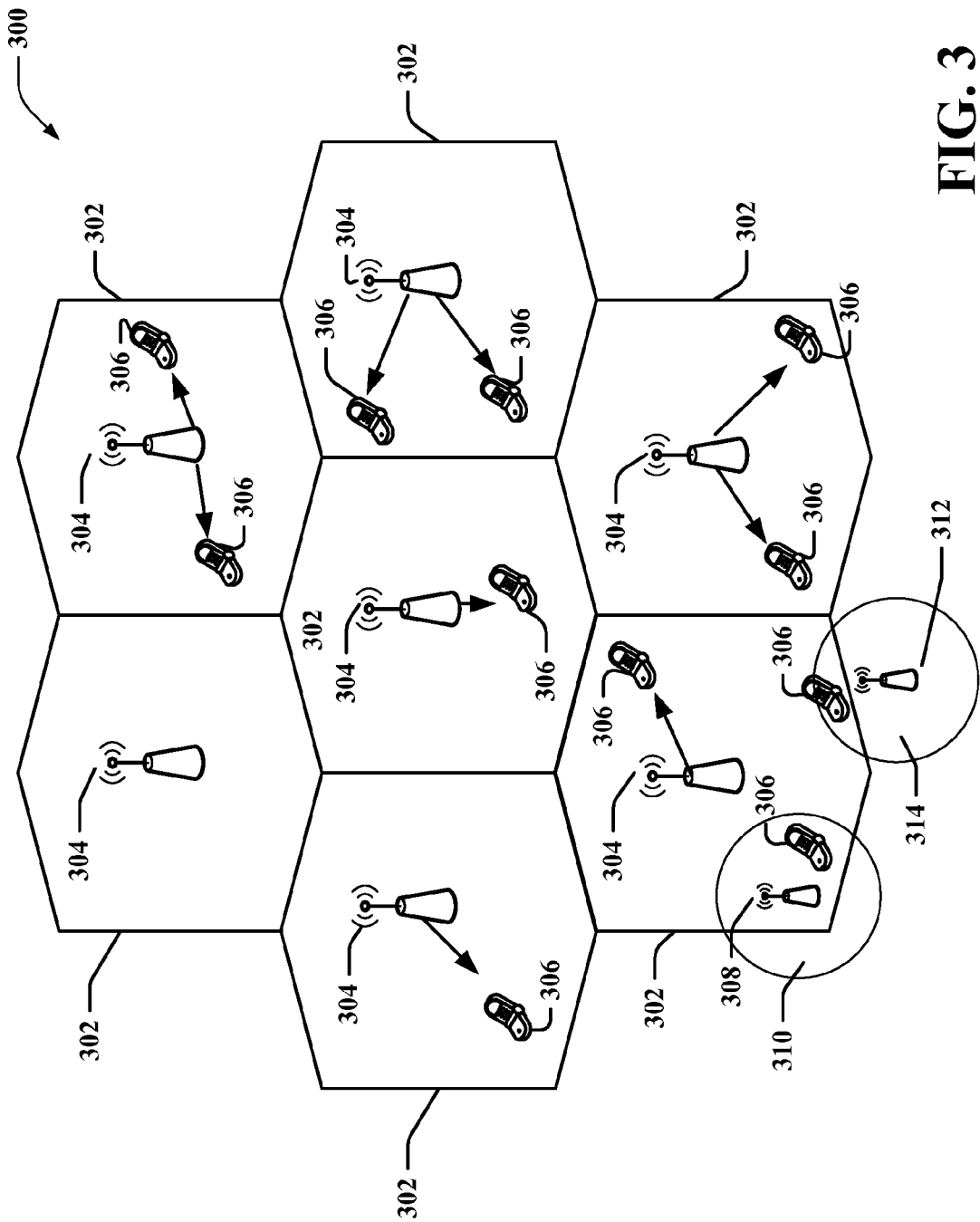
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
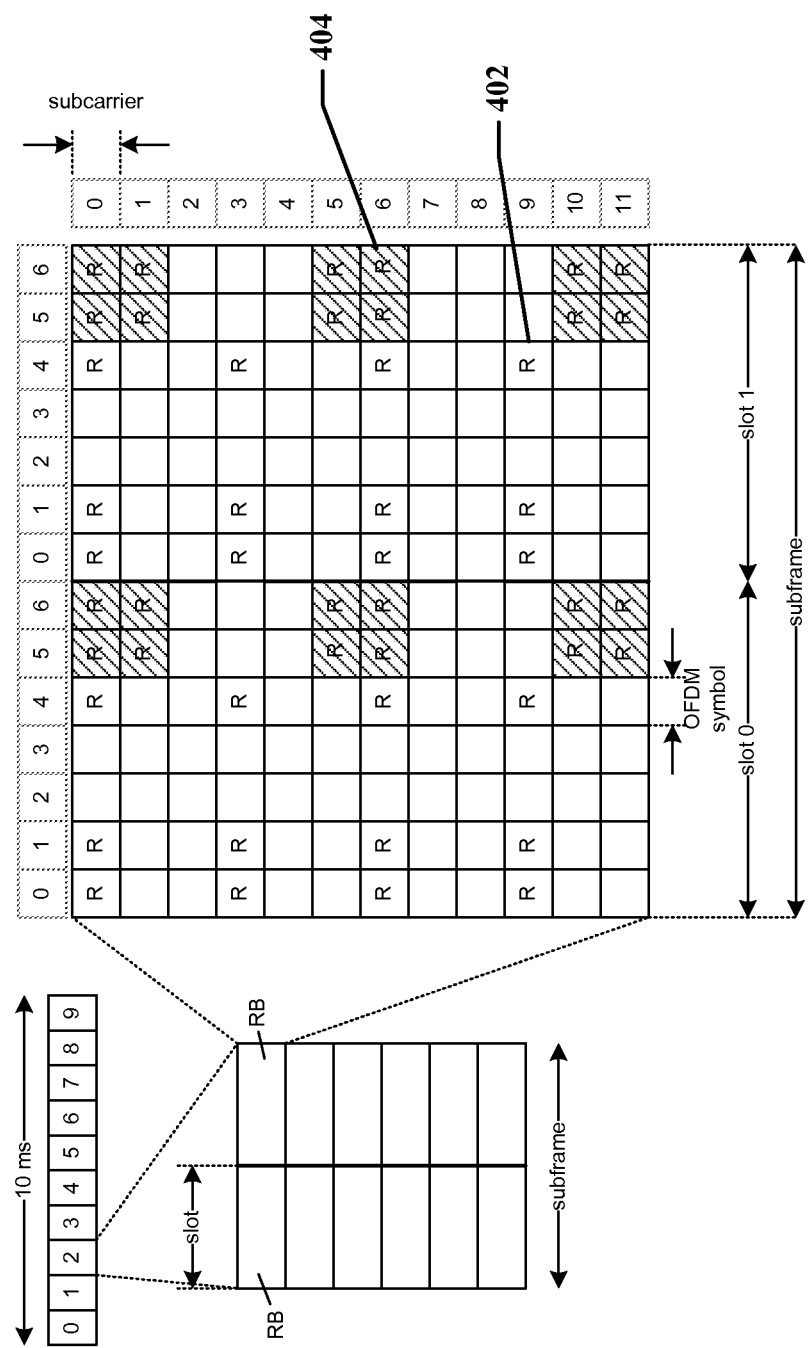
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized subframes. Each subframe includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
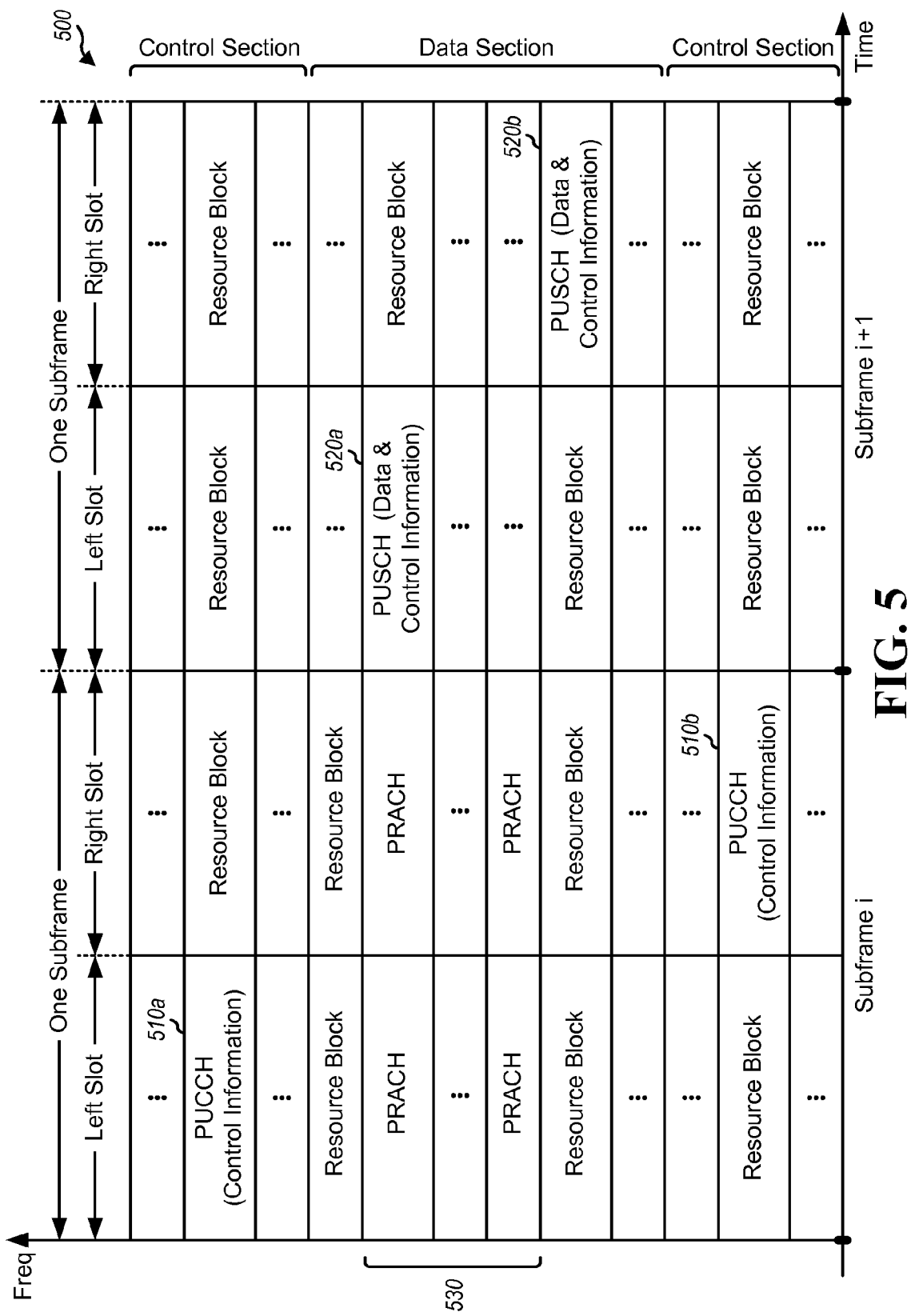
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
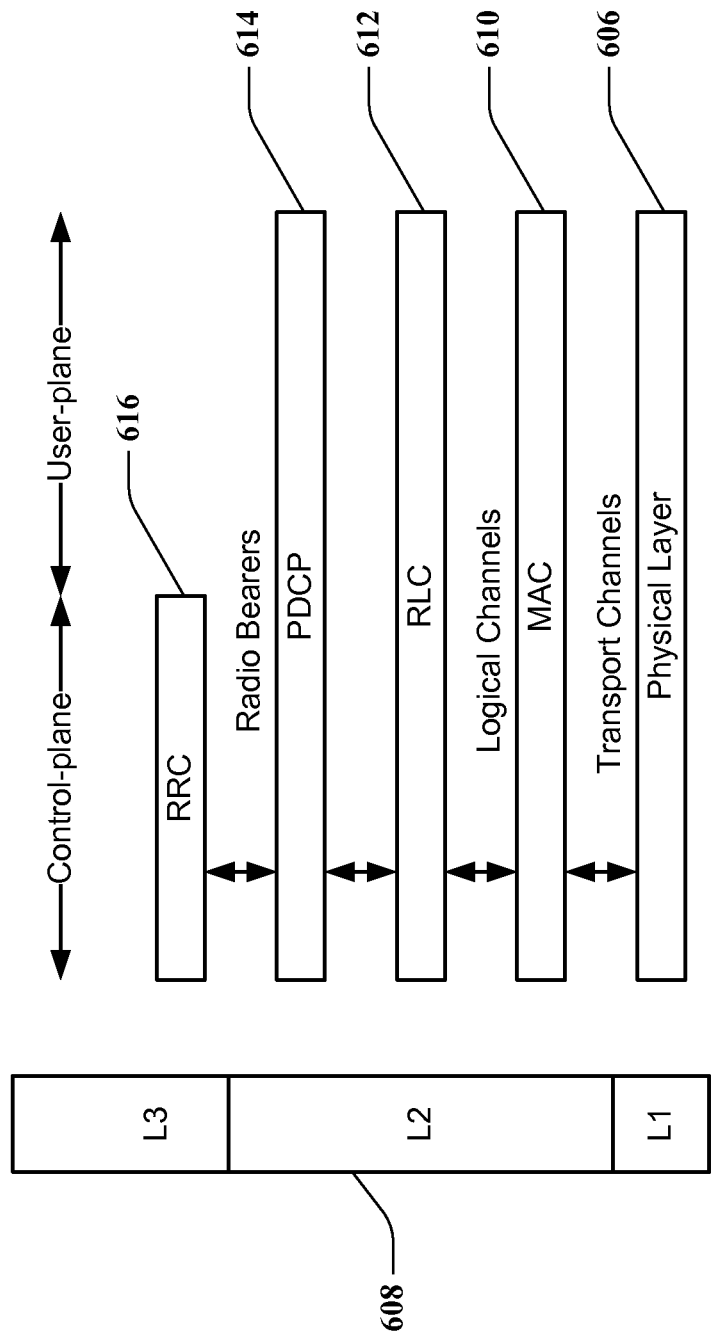
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
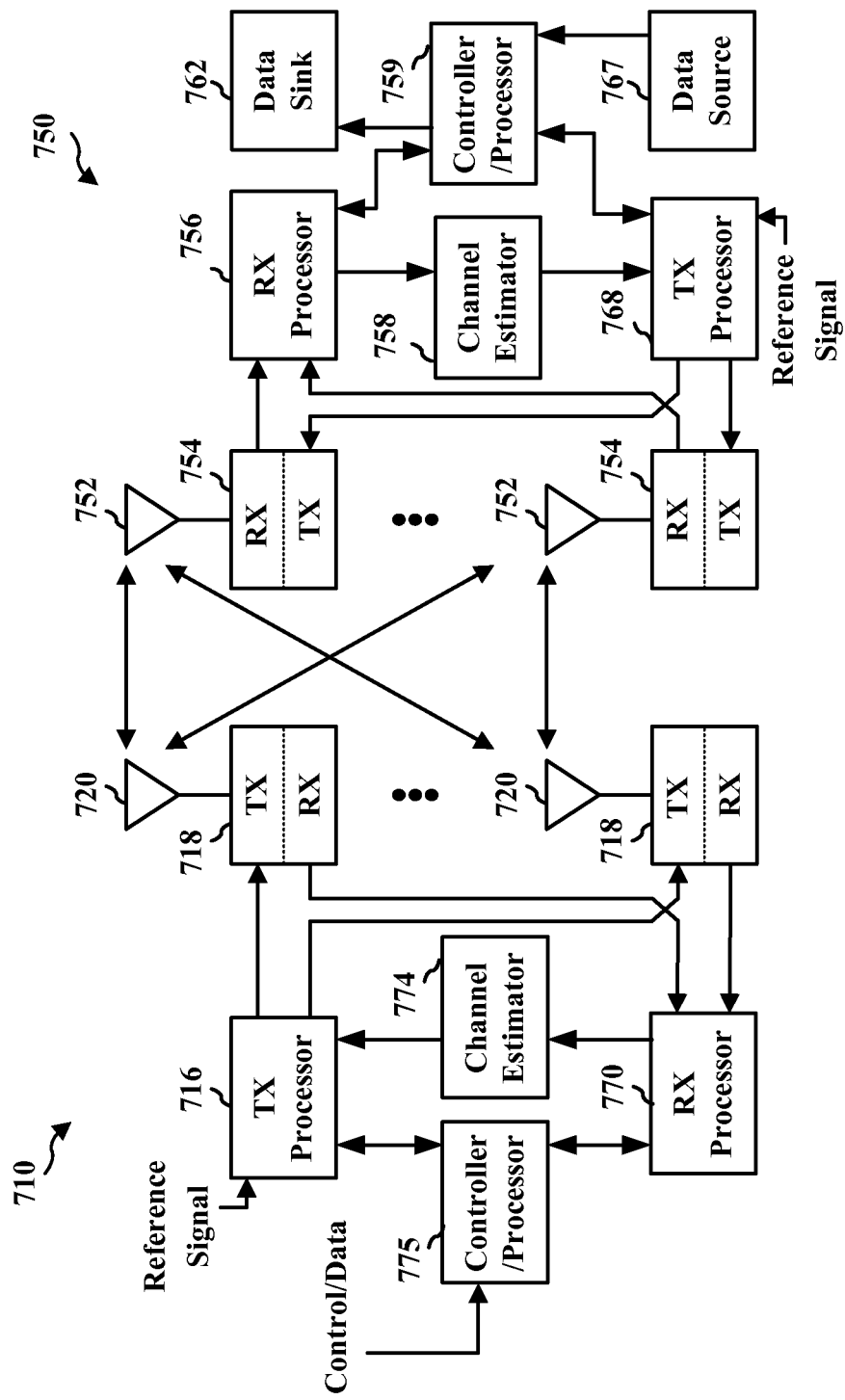
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations. In a first configuration, the processing system 114 described in relation to FIG. 1 includes the UE 750. In particular, the processing system 114 includes the TX processor 768, the RX processor 756, and the controller/processor 759. In a second configuration, the processing system 114 described in relation to FIG. 1 includes the eNB 710. In particular, the processing system 114 includes the TX processor 716, the RX processor 770, and the controller/processor 775.

Figure 8A:
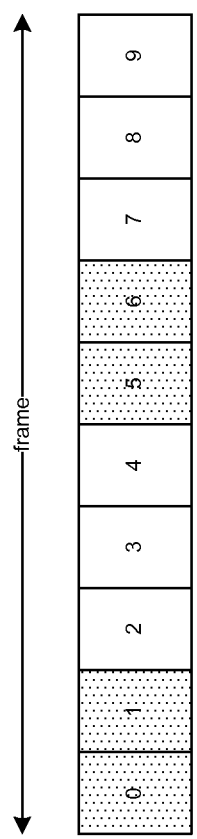
FIG. 8A is a diagram for illustrating an exemplary method.
Figure 8B:
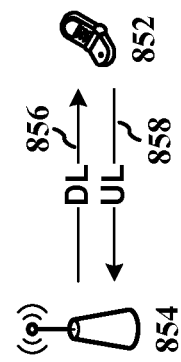
FIG. 8B is a second diagram for illustrating the exemplary method.

FIG. 8A and FIG. 8B are diagrams for illustrating an exemplary method. As shown in FIG. 8A, a frame is divided into a plurality of subframes. The frame is shown with 10 subframes, but may include any number of subframes. The subframes include a first type of subframe and a second type of subframe. For example, subframes 0, 1, 5, and 6 may each be a first type of subframe and subframes 2-4 and 7-9 may each be a second type of subframe. More than two types of subframes may also be possible. The first type of subframe may be a blank subframe, almost-blank subframe, or a multicast broadcast single frequency network (MBSFN) subframe. The second type of subframe may be a non-MBSFN subframe or a subframe that is not blank or almost blank. As another example, the first and the second types of subframes may experience different channel conditions and/or interference conditions.

As shown in FIG. 8B, the UE 852 receives a DL transmission 856 from the eNB 854 and sends an UL transmission 858 to the eNB 854. According to the exemplary method, the UE 852 may utilize a DL transmission mode for receiving DL transmissions 856 in each of the subframes based on the type of each of the subframes and/or utilize an UL transmission mode for sending UL transmissions 858 in each of the subframes based on the type of each of the subframes. For example, assume the first type of subframe is an MBSFN subframe, the second type of subframe is a non-MBSFN subframe, and the UE 852 utilizes a DL transmission mode for receiving each of the subframes. The UE 852 may utilize one of a first set of DL transmission modes for the first type of subframe and one of a second set of DL transmission modes for the second type of subframe.

In LTE Rel-8 and LTE-A Rel-9, each UE 852 is semi-statically configured with one of the DL transmission modes. There are seven DL transmission modes (modes 1-7) defined in Rel-8, and one additional DL transmission mode (mode 8) defined in Rel-9. In 3GPP TS 36.213, the Rel-9 DL transmission modes are as shown in Table 1:

TABLE 1

PDCCH and PDSCH configured by Cell Radio Network Temporary Identifier (C-RNTI)

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |

TABLE 1-continued

PDCCH and PDSCH configured by Cell Radio Network Temporary Identifier (C-RNTI)

| Transmission mode | DCI format | Search Space | Transmission scheme of PDSCH corresponding to PDCCH |
|---|---|---|---|
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port; port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission; port 7 and 8 or single-antenna port; port 7 or 8 |

While modes 1-6 rely on cell-specific reference signals (CRS) (also referred to as common reference signals), mode 7 and mode 8 rely on UE-RS. That is, in modes 1-6, CRS are transmitted, but in mode 7 and mode 8, UE-RS are transmitted.

MBSFN Vs. Non-MBSFN Subframes

MBSFN subframes do not carry CRS in the data region. As a result, MBSFN subframes provide an efficient way to support UE-RS based transmissions, especially in the context of relaying, heterogeneous networks, etc. UEs are informed whether some subframes are configured as MBSFN subframes or non-MBSFN subframes.

UE-RS Vs. CRS

UE-RS based design may be preferable due to its flexibility, efficiency, and performance benefits, especially in MBSFN based subframes. However, in non-MBSFN subframes, CRS are always transmitted. The introduction of UE-RS, along with CRS overhead, may not be better than a CRS only DL transmission in some scenarios.

Subframe Dependent DL and UL Transmission Mode in LTE-A

Assuming two subframe types, MBSFN and non-MBSFN, based on the subframe types, distinct DL transmission modes may be configured. For example, for non-MBSFN subframes, all DL transmission modes may be supported, whereas for MBSFN subframes, only UE-RS based transmission modes may be supported. As such, for non-MBSFN subframes, all DL transmission modes may be supported, including modes 1-8 above, and any new modes to be introduced in LTE-A. In addition, for MBSFN subframes, only UE-RS based DL transmission modes may be supported, including modes 7 and 8 above, and any UE-RS based new modes to be introduced in LTE-A. Such configuration can be done by Layer 3 (see FIG. 6). The same design philosophy may also applicable to other types of subframes when CRS is not transmitted, in particular, blank or almost-blank subframes.

An example best demonstrates utilizing of the DL transmission mode based on the subframe type. In FIG. 8A, subframes 0, 1, 5, and 6 are MBSFN subframes and the remaining subframes are non-MBSFN subframes. Assume the UE 852 receives DL transmissions 856 in the subframes. The UE 852 may utilize a DL transmission mode for receiving each of the subframes based on a type of each of the subframes. As such, the UE 852 may utilize DL transmission mode 7 for receiving the MBSFN subframes for subframes 0, 1, 5, and 6, and may utilize DL transmission mode 4 for receiving the non-MBSFN subframes in the remaining subframes. The available non-MBSFN DL transmission modes for non-MBSFN subframes may be all the modes. However, the available MBSFN DL transmission modes for MBSFN subframes may include only those modes in which UE-RS is transmitted, which at least includes mode 7 and mode 8. As such, a UE may be configured to use different transmission modes depending on the type of subframe, and therefore utilize a DL transmission mode for each type of subframe. Similarly, a UE may be configured to use different UL transmission modes depending on the type of subframe, and therefore utilize an UL transmission mode for each type of subframe.

The UE 852 may send channel feedback with a periodicity that depends on the type of subframe. For example, channel feedback may be sent in a first type of subframe with a first periodicity and channel feedback may be sent in a second type of subframe with a second periodicity less than the first periodicity. The periodicity of sending channel feedback in one type of subframe may be infinite, resulting in the channel feedback never being sent for that one type of subframe.

The UE 852 may construct different channel feedback for each type of subframe. For example, for a first type of subframe (e.g., MBSFN) less detailed channel feedback may be sent than for a second type of subframe (e.g., non-MBSFN). As such, a first channel feedback mode for less detailed channel feedback may be utilized for the first type of subframe and a second channel feedback mode for more detailed channel feedback may be utilized for the second type of subframe. For another example, a first type of subframe (e.g., MBSFN) may be constructed based on channel state information reference signals (CSI-RS) and a second type of subframe (e.g., non-MBSFN) may be constructed based on CRS. As such, the channel feedback can be subframe dependent such that different channel feedback is constructed depending on the reference subframe for channel measurement.

Alternatively, the channel feedback may be independent of the type of the subframe. When the channel feedback is independent of the type of the subframe, the UE 852 may construct the channel feedback based on the CRS or the CSI-RS. With respect to MBSFN and non-MBSFN subframes, the UE 852 may construct the channel feedback based on CSI-RS or CRS in both MBSFN and non-MBSFN subframes. When the UE 852 constructs the channel feedback based on the CRS, the UE 852 may use the CRS in the non-MBSFN and the CRS in the first few OFDM symbols of the MBSFN subframes.

Referring again to FIG. 8A, the first type of subframes 0, 1, 5, and 6 may experience different channel conditions (i.e., wanted signals, but at different received power levels) and/or interference conditions (i.e., additional unwanted signals) than the second type of subframes. The different interference conditions may be the result of a neighboring cell being restricted when transmitting in subframes 2-4 and 7-9 or subframes 1, 2, 5, and 6. The different channel conditions may be the result of the eNB 854 being configured to transmit with different power levels based on the type of subframe. As such, the UE 852 may experience different channel conditions and/or interference conditions on different types of subframes.

Figure 9:
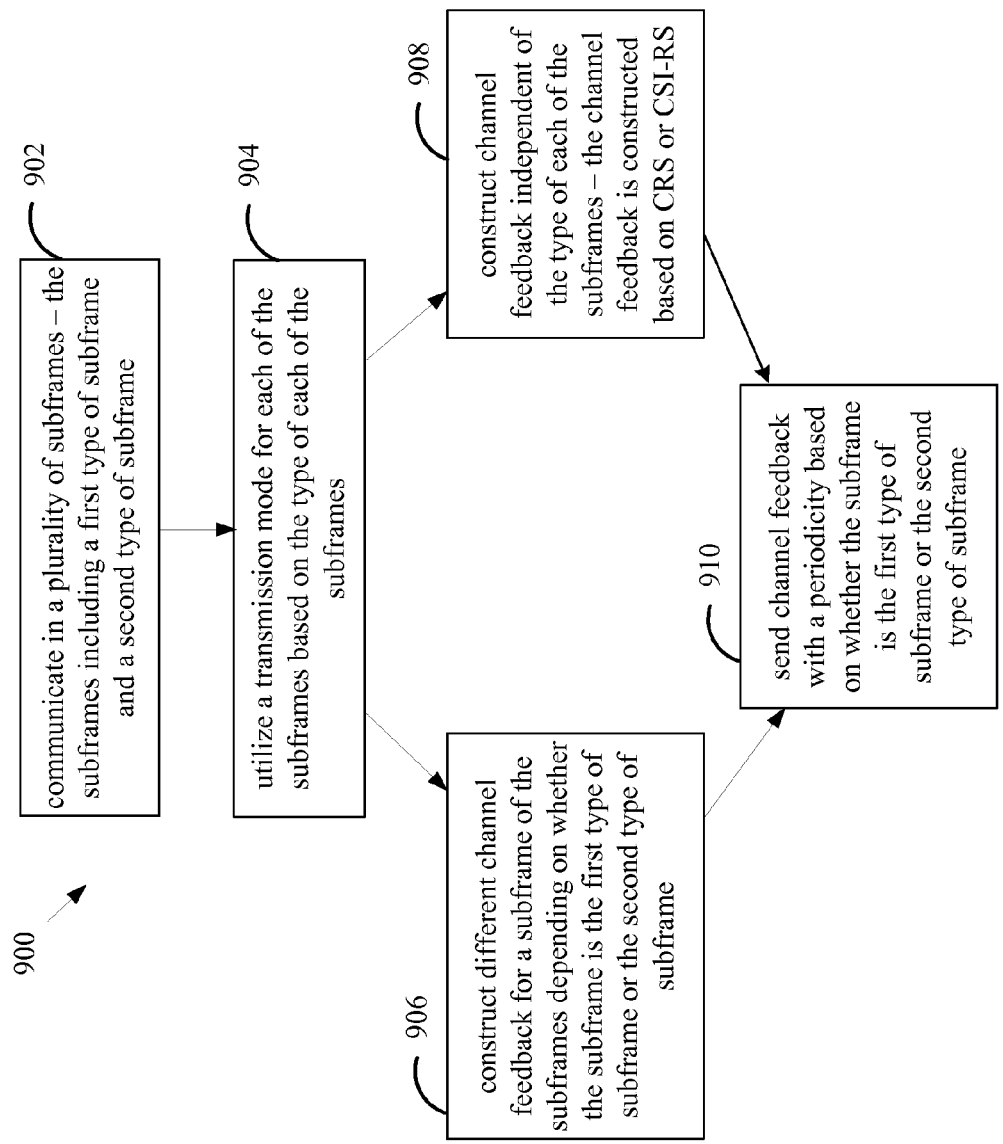
FIG. 9 is a flow chart of a method of wireless communication.

FIG. 9 is a flow chart 900 of an exemplary method wireless communication. According to the method, the UE 852 communicates in a plurality of subframes (902). The subframes include a first type of subframe and a second type of subframe (902). In addition, the UE 852 utilizes a transmission mode for each of the subframes based on the type of each of the subframes (904). The UE 852 may receive information from the eNB 854 about the subframes regarding which are of the first type of subframe and which are of the second type of subframe. In one configuration, the first type of subframe is an MBSFN subframe and the second type of subframe is a non-MBSFN subframe. As discussed supra, the first type of subframe may alternatively be a blank or almost-blank subframe. The first type of subframe and the second type of subframe may experience different channel conditions and/or interference conditions. According to the method, the UE 852 may construct different channel feedback for a subframe of the subframes depending on whether the subframe is the first type of subframe or the second type of subframe (906). That is, the channel feedback may be constructed with different modes, or alternatively, the channel feedback for the first type of subframe may be based on CSI-RS and the channel feedback for the second type of subframe may be based on CRS. For example, the channel feedback may be more or less detailed and/or the channel feedback may be based on CSI-RS or CRS for different types of subframes. More specifically, channel feedback for the first type of subframe may be less detailed and/or may be based on CSI-RS, such as when the first type of subframe is an MBSFN subframe, and the channel feedback for the second type of subframe may be more detailed and/or based on CRS, such as when the second type of subframe is a non-MBSFN subframe. Alternatively, the UE 852 may construct channel feedback independent of the type of each of the subframes (908). In such a configuration, the channel feedback is constructed based on CRS or CSI-RS. The CRS are in non-MBSFN subframes and in the first few OFDM symbols of MBSFN subframes. The CSI-RS may be in both MBSFN and non-MBSFN subframes. The UE 852 may send the channel feedback with a periodicity based on whether the subframe is the first type of subframe or the second type of subframe (910).

Figure 10:
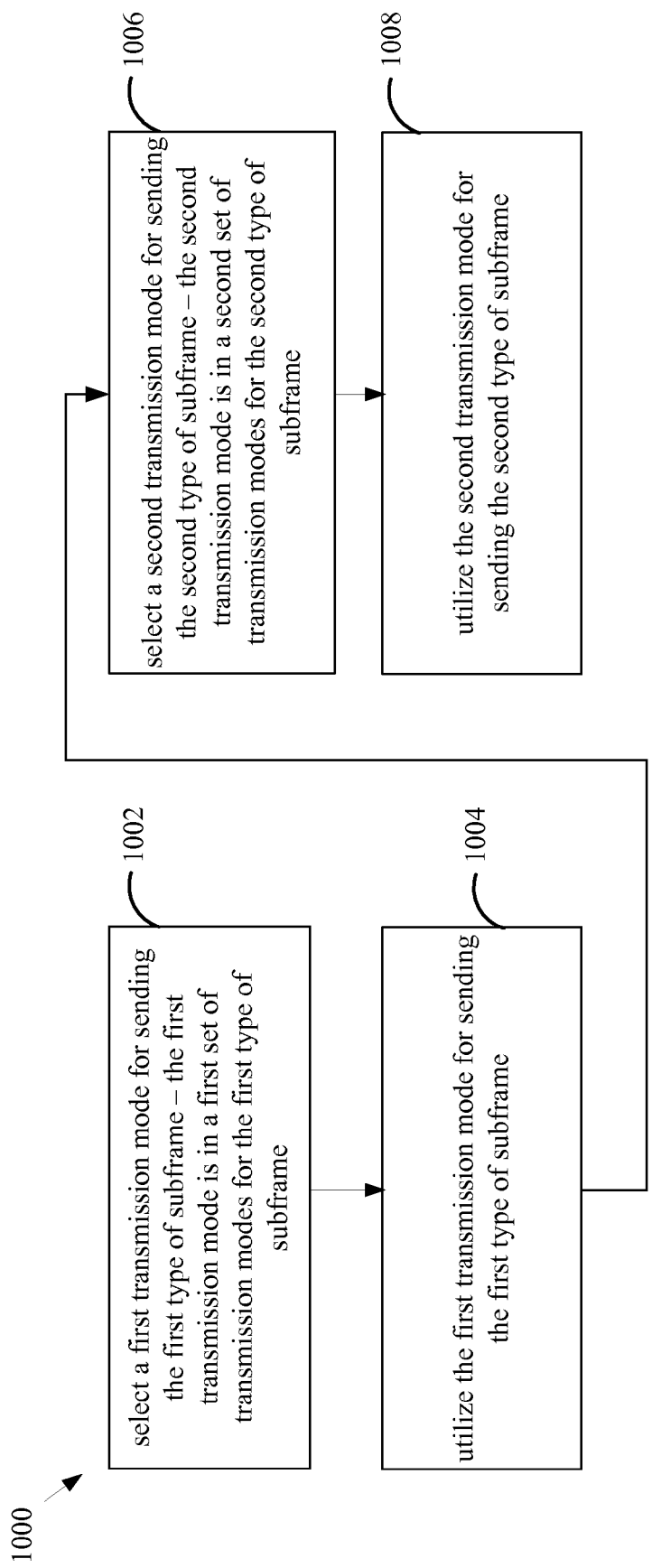
FIG. 10 is another flow chart of a method of wireless communication.

FIG. 10 is a flow chart 1000 of an exemplary method wireless communication. The transmission mode may be an UL transmission mode. In such a configuration, the communicating (902) includes sending the subframes, and the utilizing the transmission mode (904) includes utilizing an UL transmission mode for sending each of the subframes based on the type of each of the subframes. To utilize the UL transmission mode, the UE 852 selects a first transmission mode for sending the first type of subframe (1002). The first transmission mode is in a first set of transmission modes for the first type of subframe (1002). In addition, the UE 852 utilizes the first transmission mode for sending the first type of subframe (1004). The UE 852 also selects a second transmission mode for sending the second type of subframe (1006). The second transmission mode is in a second set of transmission modes for the second type of subframe (1006). In addition, the UE 852 utilizes the second transmission mode for sending the second type of subframe (1008).

Figure 11:
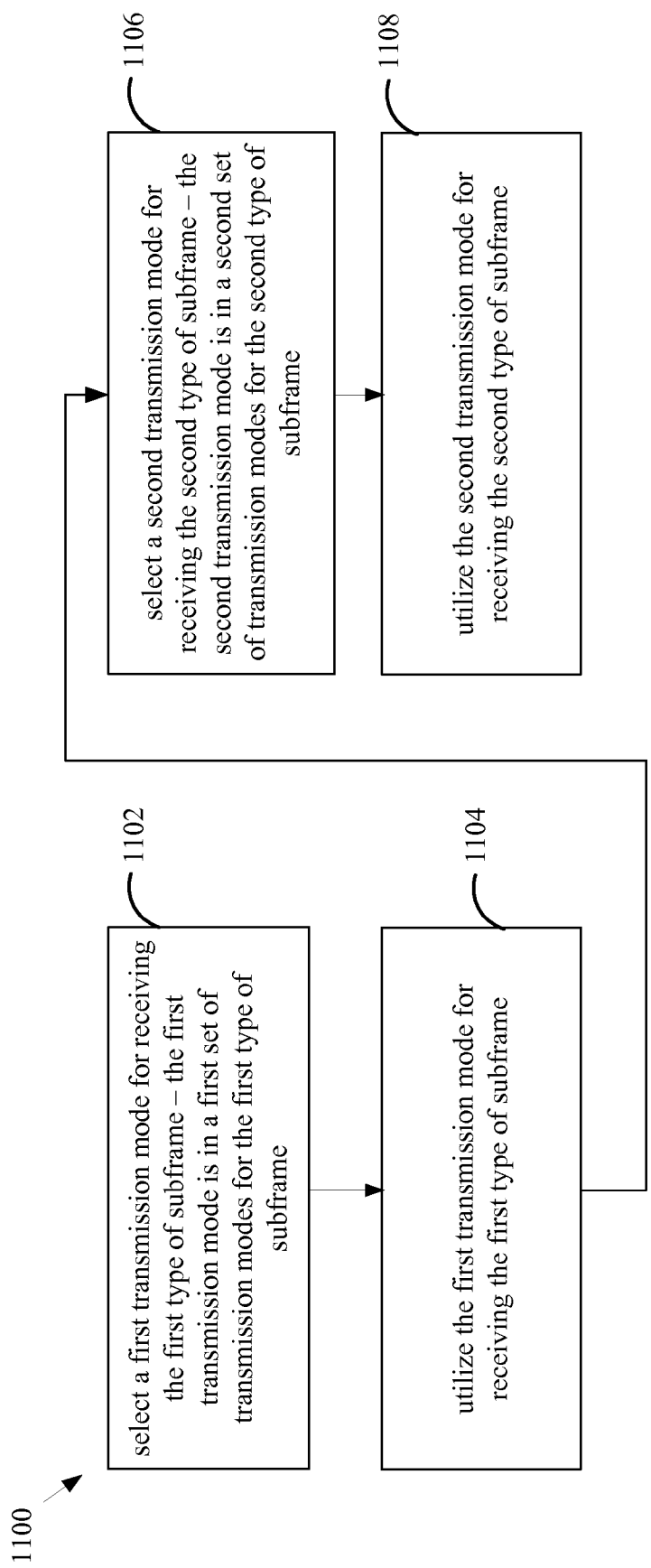
FIG. 11 is yet another flow chart of a method of wireless communication.

FIG. 11 is a flow chart 1100 of an exemplary method of wireless communication. The transmission mode may be a DL transmission mode. In such a configuration, the communicating (902) includes receiving the subframes, and the utilizing the transmission mode (904) includes utilizing a DL transmission mode for receiving each of the subframes based on the type of each of the subframes. To utilize the DL transmission mode, the UE 852 selects a first transmission mode for receiving the first type of subframe (1102). The first transmission mode is in a first set of transmission modes for the first type of subframe (1102). In addition, the UE 852 utilizes the first transmission mode for receiving the first type of subframe (1104). The UE 852 also selects a second transmission mode for receiving the second type of subframe (1106). The second transmission mode is in a second set of transmission modes for the second type of subframe (1106). In addition, the UE 852 utilizes the second transmission mode for receiving the second type of subframe (1108).

The first set of transmission modes may include all modes in which UE-RS is transmitted. The first set of transmission modes may include at least mode 7 and mode 8 and the second set of transmission modes may include all modes. The selected first transmission mode and the selected second transmission mode may be different. For example, for receiving an MBSFN subframe, the UE 852 may select mode 7 from a first set of transmission modes including mode 7 and mode 8 and may utilize the mode 7 for receiving the MBSFN subframe. For receiving a non-MBSFN subframe, the UE 852 may select mode 4 from a second set of transmission modes including all the transmission modes and may utilize the mode 4 for receiving the non-MBSFN subframe.

Figure 12:
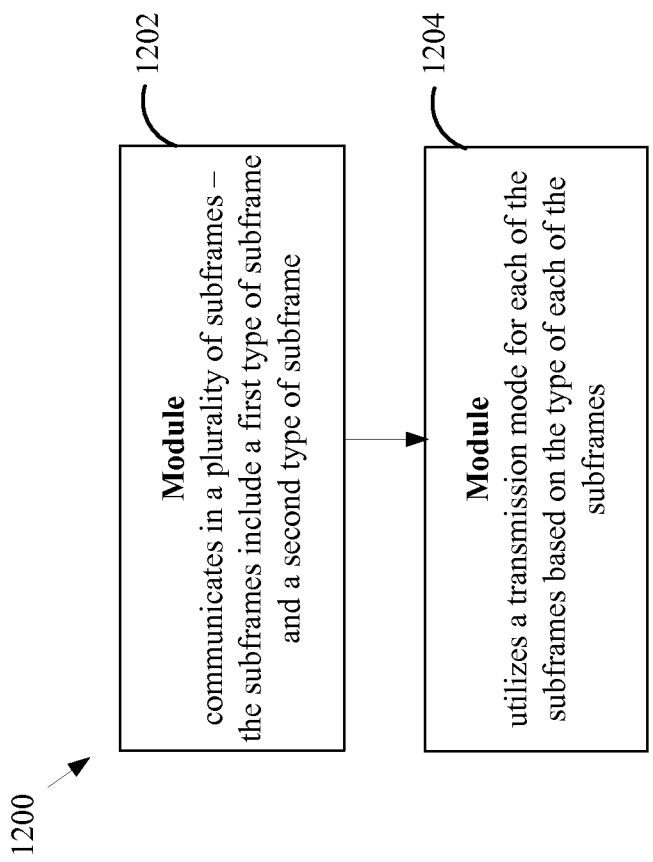
FIG. 12 is a conceptual block diagram illustrating the functionality of an exemplary apparatus.

FIG. 12 is a conceptual block diagram 1200 illustrating the functionality of an exemplary apparatus 100. The apparatus 100 is a UE and includes a module 1202 that communicates in a plurality of subframes. The subframes include a first type of subframe and a second type of subframe. The apparatus 100 further includes a module 1204 that utilizes a transmission mode for each of the subframes based on the type of each of the subframes.

Figure 13:
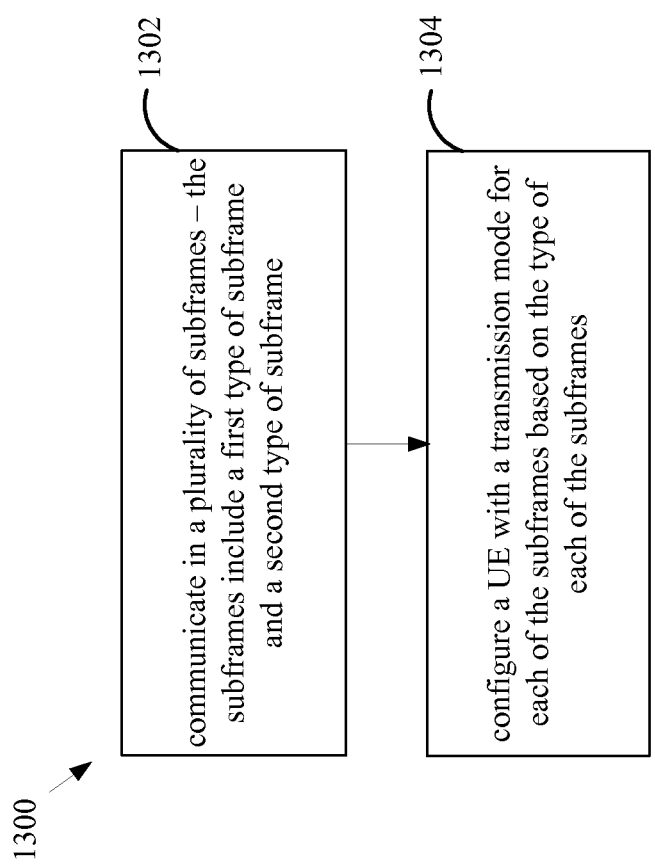
FIG. 13 is a flow chart of a second method of wireless communication.

FIG. 13 is a flow chart 1300 of an exemplary method wireless communication. According to the method, the eNB 854 communicates in a plurality of subframes (1302). The subframes include a first type of subframe and a second type of subframe (1302). In addition, the eNB 854 configures a UE with a transmission mode for each of the subframes based on the type of each of the subframes (1304). In one configuration, the first type of subframe is an MBSFN subframe and the second type of subframe is a non-MBSFN subframe. In one configuration, the eNB 854 configures the transmission mode of the UE based on channel conditions and/or interference conditions experienced the UE. In one configuration, the eNB 854 receives different channel feedback for a subframe of the subframes depending on whether the subframe is the first type of subframe or the second type of subframe.

Figure 14:
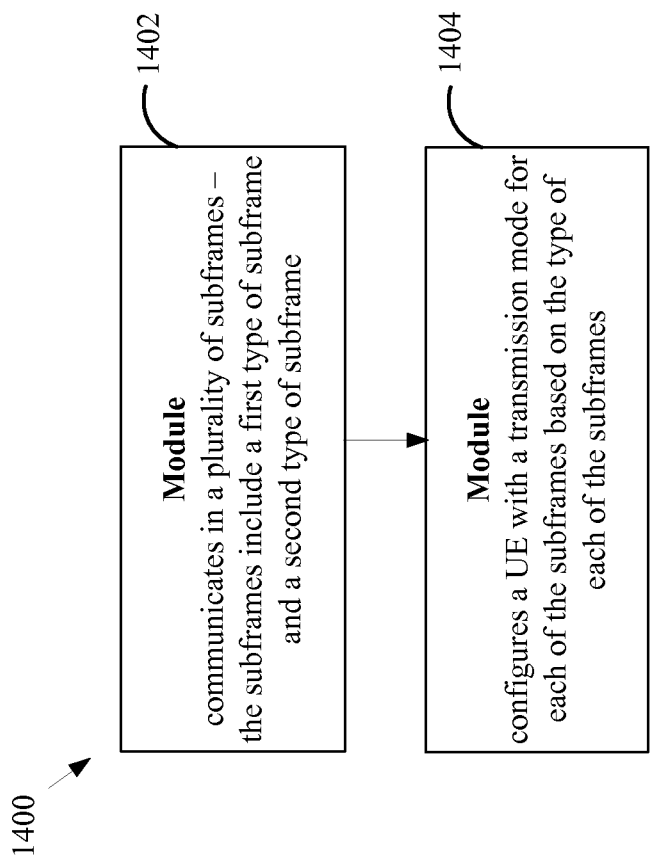
FIG. 14 is a conceptual block diagram illustrating the functionality of a second exemplary apparatus.

FIG. 14 is a conceptual block diagram 1400 illustrating the functionality of an exemplary apparatus 100. The apparatus 100 is an eNB and includes a module 1402 that communicates in a plurality of subframes. The subframes include a first type of subframe and a second type of subframe. In addition, the apparatus 100 includes a module 1404 that configures a UE with a transmission mode for each of the subframes based on the type of each of the subframes.

Referring to FIG. 1 and FIG. 7, in one configuration, the apparatus 100 for wireless communication is a UE and includes means for communicating in a plurality of subframes. The subframes include a first type of subframe and a second type of subframe. The apparatus 100 further includes means for utilizing a transmission mode for each of the subframes based on the type of each of the subframes. In one configuration, the apparatus 100 further includes means for constructing different channel feedback for a subframe of the subframes depending on whether the subframe is the first type of subframe or the second type of subframe. In one configuration, the apparatus 100 further includes means for sending channel feedback with a periodicity based on whether the subframe is the first type of subframe or the second type of subframe. In one configuration, the apparatus 100 further includes means for constructing channel feedback independent of the type of each of the subframes. The channel feedback is constructed based on CRS or CSI-RS. The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

In another configuration, the apparatus 100 for wireless communication is an eNB and includes means for communicating in a plurality of subframes. The subframes include a first type of subframe and a second type of subframe. In addition, the apparatus 100 includes means for configuring a UE with a transmission mode for each of the subframes based on the type of each of the subframes. In one configuration, the apparatus 100 further includes means for receiving different channel feedback for a subframe of the subframes depending on whether the subframe is the first type of subframe or the second type of subframe. The aforementioned means is the processing system 114 configured to perform the functions recited by the aforementioned means. As described supra, the processing system 114 includes the TX Processor 716, the RX Processor 770, and the controller/processor 775. As such, in one configuration, the aforementioned means may be the TX Processor 716, the RX Processor 770, and the controller/processor 775 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:
1. A method of wireless communication, comprising:
communicating in a plurality of subframes, the subframes comprising a first type of subframe and a second type of subframe;
selecting, from a first set of transmission modes, a first transmission mode for the first type of subframe, wherein the first set of transmission modes is determined based at least in part on the first type of subframe, and wherein the first set of transmission modes comprises all transmission modes in which a user equipment specific reference signal is transmitted;
selecting, from a second set of transmission modes, a second transmission mode for the second type of subframe, wherein the second set of transmission modes is determined based at least in part on the second type of subframe, and wherein the first set of transmission modes is a subset of the second set of transmission modes; and
constructing different channel feedback for a subframe of the plurality of subframes depending on whether the subframe is of the first type of subframe or of the second type of subframe;
wherein the communicating in the plurality of subframes comprises using the first transmission mode to communicate in subframes of the first type of subframe and using the second transmission mode to communicate in subframes of the second type of subframe.
2. The method of claim 1, wherein the first type of subframe is a multicast broadcast single frequency network (MBSFN) subframe and the second type of subframe is a non-MBSFN subframe.

3. The method of claim 1, wherein the first type of subframe and the second type of subframe experience different channel conditions or interference conditions.

4. The method of claim 1, wherein the first and second set of transmission modes are uplink (UL) transmission modes, and the communicating in a plurality of subframes comprises sending the subframes.

5. The method of claim 1, wherein the first and second set of transmission modes are downlink (DL) transmission modes, and the communicating in a plurality of subframes comprises receiving the subframes.

6. The method of claim 5, wherein the first set of transmission modes comprises at least LTE Rel-9 transmission mode 7 and mode 8.

7. The method of claim 5, wherein the second set of transmission modes comprises all LTE Rel-9 transmission modes.

8. The method of claim 5, wherein the selected first transmission mode and the selected second transmission mode are different.

9. The method of claim 1, wherein the channel feedback is constructed with different modes.

10. The method of claim 1, wherein the channel feedback for the first type of subframe is based on channel state information reference signals (CSI-RS) and the channel feedback for the second type of subframe is based on cell-specific reference signals (CRS).

11. The method of claim 1, further comprising sending channel feedback with a periodicity in a subframe of the first or second type based on whether the subframe is the first type of subframe or the second type of subframe.

12. The method of claim 1, further comprising constructing channel feedback independent of the type of each of the subframes, the channel feedback being constructed based on cell-specific reference signals (CRS) or channel state information reference signals (CSI-RS).

13. The method of claim 1, further comprising receiving information about the subframes regarding which are of the first type of subframe and which are of the second type of subframe.

14. A method of wireless communication, comprising:
communicating in a plurality of subframes, the subframes comprising a first type of subframe and a second type of subframe;
selecting, from a first set of transmission modes, a first transmission mode for the first type of subframe, wherein the first set of transmission modes is determined based at least in part on the first type of subframe, and wherein the first set of transmission modes comprises all transmission modes in which a user equipment specific reference signal is transmitted;
selecting, from a second set of transmission modes, a second transmission mode for the second type of subframe, wherein the second set of transmission modes is determined based at least in part on the second type of subframe, and wherein the first set of transmission modes is a subset of the second set of transmission modes;
configuring a user equipment (UE) to communicate in the plurality of subframes by using the first transmission mode to communicate in subframes of the first type of subframe and by using the second transmission mode to communicate in subframes of the second type of subframe; and
receiving different channel feedback for a subframe of the plurality of subframes depending on whether the subframe is of the first type of subframe or of the second type of subframe.

15. The method of claim 14, wherein the first type of subframe is a multicast broadcast single frequency network (MBSFN) subframe and the second type of subframe is a non-MBSFN subframe.

16. The method of claim 14, wherein the configuring the UE comprises configuring transmission modes of the UE based on channel conditions or interference conditions experienced by the UE.

17. The method of claim 14, wherein the channel feedback received for the first type of subframe is based on channel state information reference signals (CSI-RS) and the channel feedback received for the second type of subframe is based on cell-specific reference signals (CRS).

18. The method of claim 14, wherein the channel feedback received for the first type of subframe is based on channel state information reference signals (CSI-RS) and the channel feedback received for the second type of subframe is based on cell-specific reference signals (CRS).

19. An apparatus for wireless communication, comprising:
means for communicating in a plurality of subframes, the subframes comprising a first type of subframe and a second type of subframe;
means for selecting, from a first set of transmission modes, a first transmission mode for the first type of subframe, wherein the first set of transmission modes is determined based at least in part on the first type of subframe, and wherein the first set of transmission modes comprises all transmission modes in which a user equipment specific reference signal is transmitted;
means for selecting, from a second set of transmission modes, a second transmission mode for the second type of subframe, wherein the second set of transmission modes is determined based at least in part on the second type of subframe, and wherein the first set of transmission modes is a subset of the second set of transmission modes; and
means for constructing different channel feedback for a subframe of the plurality of subframes depending on whether the subframe is of the first type of subframe or of the second type of subframe;
wherein the means for communicating in the plurality of subframes comprises using the first transmission mode to communicate in subframes of the first type of subframe from the plurality of subframes and using the second transmission mode to communicate in subframes of the second type of subframe.

20. The apparatus of claim 19, wherein the means for constructing different channel feedback is operable to construct channel feedback with different modes.

21. The apparatus of claim 19, wherein the means for constructing different channel feedback is operable to construct channel feedback for the first type of subframe based on channel state information reference signals (CSI-RS) and construct channel feedback for the second type of subframe is based on cell-specific reference signals (CRS).

22. An apparatus for wireless communication, comprising:
means for communicating in a plurality of subframes, the subframes comprising a first type of subframe and a second type of subframe;
means for selecting, from a first set of transmission modes, a first transmission mode for the first type of subframe, wherein the first set of transmission modes is determined based at least in part on the first type of subframe, and wherein the first set of transmission modes comprises all transmission modes in which a user equipment specific reference signal is transmitted;

means for selecting, from a second set of transmission modes, a second transmission mode for the second type of subframe, wherein the second set of transmission modes is determined based at least in part on the second type of subframe, and wherein the first set of transmission modes is a subset of the second set of transmission modes;

means for configuring a user equipment (UE) to communicate in the plurality of subframes by using the first transmission mode to communicate in subframes of the first type of subframe and by using the second transmission mode to communicate in subframes of the second type of subframe; and means for receiving different channel feedback for a subframe of the plurality of subframes depending on whether the subframe is of the first type of subframe or of the second type of subframe.

23. The apparatus of claim 22, wherein the means for configuring the UE comprises means for configuring transmission modes of the UE based on channel conditions or interference conditions experienced by the UE.

24. The non-transitory computer-readable medium of claim 23, wherein the code for configuring the UE comprises code for configuring transmission modes of the UE based on channel conditions or interference conditions experienced by the UE.

25. The apparatus of claim 22, wherein the channel feedback received for the first type of subframe is based on channel state information reference signals (CSI-RS) and the channel feedback received for the second type of subframe is based on cell-specific reference signals (CRS).

26. A non-transitory computer-readable medium comprising code for:
communicating in a plurality of subframes, the subframes comprising a first type of subframe and a second type of subframe;
selecting, from a first set of transmission modes, a first transmission mode for the first type of subframe, wherein the first set of transmission modes is determined based at least in part on the first type of subframe, and wherein the first set of transmission modes comprises all transmission modes in which a user equipment specific reference signal is transmitted;
selecting, from a second set of transmission modes, a second transmission mode for the second type of subframe, wherein the second set of transmission modes is determined based at least in part on the second type of subframe, and wherein the first set of transmission modes is a subset of the second set of transmission modes; and
constructing different channel feedback for a subframe of the plurality of subframes depending on whether the subframe is of the first type of subframe or of the second type of subframe;
wherein the communicating in the plurality of subframes comprises using the first transmission mode to communicate in subframes of the first type of subframe and using the second transmission mode to communicate in subframes of the second type of subframe.

27. The non-transitory computer-readable medium of claim 26, wherein the code for constructing different channel feedback comprises code for constructing channel feedback with different modes.

28. The non-transitory computer-readable medium of claim 26, wherein the code for constructing different channel feedback comprises code for constructing channel feedback for the first type of subframe based on channel state information reference signals (CSI-RS) and code for constructing channel feedback for the second type of subframe is based on cell-specific reference signals (CRS).

29. A non-transitory computer-readable medium comprising code for:
communicating in a plurality of subframes, the subframes comprising a first type of subframe and a second type of subframe;
selecting, from a first set of transmission modes, a first transmission mode for the first type of subframe, wherein the first set of transmission modes is determined based at least in part on the first type of subframe, and wherein the first set of transmission modes comprises all transmission modes in which a user equipment specific reference signal is transmitted;
selecting, from a second set of transmission modes, a second transmission mode for the second type of subframe, wherein the second set of transmission modes is determined based at least in part on the second type of subframe, and wherein the first set of transmission modes is a subset of the second set of transmission modes;
configuring a user equipment (UE) to communicate in the plurality of subframes by using the first transmission mode to communicate in subframes of the first type of subframe and by using the second transmission mode to communicate in subframes of the second type of subframe; and
receiving different channel feedback for a subframe of the plurality of subframes depending on whether the subframe is of the first type of subframe or of the second type of subframe.

30. The non-transitory computer-readable medium of claim 29, wherein the channel feedback received for the first type of subframe is based on channel state information reference signals (CSI-RS) and the channel feedback received for the second type of subframe is based on cell-specific reference signals (CRS).

31. An apparatus for wireless communication, comprising:
a processor configured to:
communicate in a plurality of subframes, the subframes comprising a first type of subframe and a second type of subframe;
select, from a first set of transmission modes, a first transmission mode for the first type of subframe, wherein the first set of transmission modes is determined based at least in part on the first type of subframe, and wherein the first set of transmission modes comprises all transmission modes in which a user equipment specific reference signal is transmitted;
select, from a second set of transmission modes, a second transmission mode for the second type of subframe, wherein the second set of transmission modes is determined based at least in part on the second type of subframe, and wherein the first set of transmission modes is a subset of the second set of transmission modes; and
construct different channel feedback for a subframe of the plurality of subframes depending on whether the subframe is of the first type of subframe or of the second type of subframe;
wherein the communicating in the plurality of subframes comprises using the first transmission mode to communicate in subframes of the first type of subframe and using the second transmission mode to communicate in subframes of the second type of subframe.

32. The apparatus of claim 31, wherein the first type of subframe is a multicast broadcast single frequency network (MBSFN) subframe and the second type of subframe is a non-MBSFN subframe.

33. The apparatus of claim 31, wherein the first type of subframe and the second type of subframe experience different channel conditions or interference conditions.

34. The apparatus of claim 31, wherein the first and second set of transmission modes are uplink (UL) transmission modes, and wherein the processor is configured to send the subframes using the first transmission mode to send subframes of the first type of subframe and using the second transmission mode to send subframes of the second type of subframe.

35. The apparatus of claim 31, wherein the first and second set of transmission modes are downlink (DL) transmission modes, and wherein the processor is configured to receive the subframes using the first transmission mode to receive subframes of the first type of subframe and using the second transmission mode to receive subframes of the second type of subframe.

36. The apparatus of claim 35, wherein the first set of transmission modes comprises at least LTE Rel-9 transmission mode 7 and mode 8.

37. The apparatus of claim 35, wherein the second set of transmission modes comprises all LTE Rel-9 transmission modes.

38. The apparatus of claim 35, wherein the selected first transmission mode and the selected second transmission mode are different.

39. The apparatus of claim 31, wherein the channel feedback is constructed with different modes.

40. The apparatus of claim 31, wherein the channel feedback for the first type of subframe is based on channel state information reference signals (CSI-RS) and the channel feedback for the second type of subframe is based on cell-specific reference signals (CRS).

41. The apparatus of claim 31, wherein the processor is configured to send channel feedback with a periodicity in a subframe of the first or second type based on whether the subframe is the first type of subframe or the second type of subframe.

42. The apparatus of claim 31, wherein the processor is configured to construct channel feedback independent of the type of each of the subframes, the channel feedback being constructed based on cell-specific reference signals (CRS) or channel state information reference signals (CSI-RS).

43. The apparatus of claim 31, wherein the processor is configured to receive information about the subframes regarding which are of the first type of subframe and which are of the second type of subframe.

44. An apparatus for wireless communication, comprising:
a processor configured to:
communicate in a plurality of subframes, the subframes comprising a first type of subframe and a second type of subframe;
select, from a first set of transmission modes, a first transmission mode for the first type of subframe, wherein the first set of transmission modes is determined based at least in part on the first type of subframe, and wherein the first set of transmission modes comprises all transmission modes in which a user equipment specific reference signal is transmitted;
select, from a second set of transmission modes, a second transmission mode for the second type of subframe, wherein the second set of transmission modes is determined based at least in part on the second type of subframe, and wherein the first set of transmission modes is a subset of the second set of transmission modes;
configure a user equipment (UE) to communicate in the plurality of subframes by using the first transmission mode to communicate in subframes of the first type of subframe and by using the second transmission mode to communicate in subframes of the second type of subframe; and
receive different channel feedback for a subframe of the plurality of subframes depending on whether the subframe is of the first type of subframe or of the second type of subframe.

45. The apparatus of claim 44, wherein the first type of subframe is a multicast broadcast single frequency network (MBSFN) subframe and the second type of subframe is a non-MBSFN subframe.

46. The apparatus of claim 44, wherein the processor is configured to configure the UE based on channel conditions or interference conditions experienced by the UE.

\* \* \* \* \*